United States Patent
Schacht et al.

(10) Patent No.: US 12,060,120 B2
(45) Date of Patent: Aug. 13, 2024

(54) VEHICLE STEERING SYSTEM

(71) Applicant: Dana Belgium N.V., Flanders (BE)

(72) Inventors: Filip D. Schacht, Meulebeke (BE); Kurt Cattoor, Koolkerke (BE)

(73) Assignee: DANA BELGIUM N.V., Flanders (BE)

( * ) Notice: Subject to any disclaimer, the term of this patent is extended or adjusted under 35 U.S.C. 154(b) by 220 days.

(21) Appl. No.: 17/446,711

(22) Filed: Sep. 1, 2021

(65) Prior Publication Data
US 2022/0135122 A1     May 5, 2022

Related U.S. Application Data

(60) Provisional application No. 63/108,191, filed on Oct. 30, 2020.

(51) Int. Cl.
*B62D 5/07* (2006.01)
*B62D 5/065* (2006.01)
*B62D 5/30* (2006.01)

(52) U.S. Cl.
CPC .............. *B62D 5/07* (2013.01); *B62D 5/065* (2013.01); *B62D 5/30* (2013.01)

(58) Field of Classification Search
CPC ............. B62D 5/07; B62D 5/065; B62D 5/30
USPC ........................................................ 60/405
See application file for complete search history.

(56) References Cited

U.S. PATENT DOCUMENTS

| | | | | |
|---|---|---|---|---|
| 3,747,725 | A  * | 7/1973 | Feustel | B62D 5/30 180/406 |
| 7,694,772 | B1 * | 4/2010 | Doll | B60T 13/686 180/235 |
| 8,808,124 | B2 * | 8/2014 | Major | B60K 25/00 180/65.265 |
| 2002/0043057 | A1 * | 4/2002 | Shiba | B62D 3/02 56/1 |
| 2006/0196720 | A1 * | 9/2006 | Zahniser | B62D 5/065 123/41.11 |
| 2008/0006469 | A1 * | 1/2008 | Sasaki | B62D 5/0481 180/428 |
| 2020/0363811 | A1 * | 11/2020 | Nishii | A01B 69/008 |
| 2020/0386248 | A1 * | 12/2020 | McNamee | E02F 9/225 |

FOREIGN PATENT DOCUMENTS

| | | | | |
|---|---|---|---|---|
| DE | 102013018237 A1 | | 1/2015 | |
| WO | WO-2009083220 A1 | * | 7/2009 | ............ B60K 25/06 |
| WO | WO-2014166313 A1 | * | 10/2014 | ............... B62D 5/30 |

* cited by examiner

*Primary Examiner* — Tony H Winner
*Assistant Examiner* — Hosam Shabara
(74) *Attorney, Agent, or Firm* — McCoy Russell LLP

(57) ABSTRACT

A steering system for a vehicle is provided. The steering system includes a mechanical interface coupled to an auxiliary hydraulic steering pump and an output of a transmission. In the system, the transmission is mechanically coupled to a motive power source and the auxiliary hydraulic steering pump is hydraulically coupled to a hydraulic steering assembly.

16 Claims, 4 Drawing Sheets

VEHICLE STEERING SYSTEM

CROSS REFERENCE TO RELATED APPLICATION

The present application claims priority to U.S. Provisional Application No. 63/108,191, entitled "VEHICLE STEERING SYSTEM", and filed on Oct. 30, 2020. The entire contents of the above-listed application are hereby incorporated by reference for all purposes.

TECHNICAL FIELD

The present disclosure relates to a vehicle steering system with an auxiliary hydraulic steering pump.

BACKGROUND AND SUMMARY

Power steering systems in vehicles typically include a hydraulic pump driven by the engine. The pump along with components such as valves and gears cooperatively function to modulate the steering force generated by the vehicle operator.

Degradation of the pump may occur under some conditions, leading to the loss of steering force assistance from the steering system. Attempts have been made to provide back-up steering pumps that strive to sustain steering force modulation when the engine is not able to drive the primary steering pump due to degradation of the engine and the steering pump, for instance. US 2008/0006469 A1 to Sasaki et al. teaches a steering system with two electric motors each of which drive separate hydraulic pumps. Hydraulic circuitry routes the fluid to a steering cylinder from the hydraulic pumps. Sasaki teaches a diagnostic system which attempts to reduce the chance of losing steering force amplification.

The inventors have recognized several drawbacks with Sasaki's steering system. For instance, the electric motors and their power source may be susceptible to degradation or in some cases the power source may not have the energy available to power the electric motors that drive the hydraulic pumps. Consequently, Sasaki's steering system may be inoperative during certain conditions. Thus, Sasaki's system and other electrically powered steering systems may be prone to inoperability, under certain conditions, and involve complex control, diagnostic, and repair methods, in certain circumstances.

To overcome at least some of abovementioned drawbacks, a vehicle steering system is provided. The steering system includes a mechanical interface coupled to an auxiliary hydraulic steering pump and an output of a transmission. In the system, the transmission is mechanically coupled to a motive power source and the auxiliary hydraulic steering pump is hydraulically coupled to a hydraulic steering assembly. In this way, a mechanically driven back-up steering pump is provided in the vehicle to decrease the chance of steering assistance loss. Consequently, system reliability is increased even in situations where an engine or other motive power source ceases to function as desired.

Further in one example, the steering system may further include a bimodal valve attached to the output of the auxiliary hydraulic steering pump. In a first mode, the valve permits fluid flow from the auxiliary hydraulic steering pump to a transmission sump. In the second mode, the valve permits fluid flow from the auxiliary hydraulic steering pump to the hydraulic steering assembly for steering force modulation. In this way, the window over which steering assistance is provided by the steering assembly is expanded.

Further in one example, the steering system may include a disconnect device, such as a wet clutch, coupled to the mechanical interface and configured to selectively disconnect the auxiliary hydraulic steering pump from the transmission output. In this way, the auxiliary hydraulic steering pump may be driven via the transmission output during selected times and disconnected during other times to increase system and vehicle efficiency, more generally.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 is drawn approximately to scale. However, other relative dimensions may be used, in other embodiments.

DETAILED DESCRIPTION

Embodiments of a vehicle steering system are described herein. In the system, an auxiliary hydraulic steering pump is coupled to a transmission output. The auxiliary steering pump provides hydraulic fluid to a hydraulic steering assembly that includes a hydraulic piston, for instance, and other components designed to adjust an angle of the steerable wheels. In a first example, the vehicle steering system may include a valve coupled to the auxiliary hydraulic pump and operable in two modes. In a first mode, the valve delivers unpressurized fluid from the auxiliary hydraulic steering pump back to a transmission sump. In the second mode, the valve delivers fluid to the hydraulic steering assembly. Consequently, the first example of the steering system reduces the chance of the hydraulic steering assembly losing hydraulic fluid pressurization. In a second example, selective connection of the auxiliary hydraulic steering pump occurs via a disconnect device, such as a wet clutch, in the mechanical interface between the auxiliary steering pump and the transmission. The disconnect device may be actively controlled via logic in a controller based on vehicle operating conditions and/or vehicle operator input, in some instances. In other instances, the disconnect device may be passively controlled via internal device componentry such as a spring applied hydraulic release wet clutch that actives the wet clutch when a pressure in the transmission sump drops below a threshold pressure and releases the wet clutch when the sump pressure surpasses the threshold. The threshold pressure may be indicative of the transmission sump losing its regulated pressure due to the engine switching off from degradation, operator input, or other reasons. Thus, the spring applied hydraulic release wet clutch may induce clutch actuation during desired periods and disable the clutch during other periods when back-up pump hydraulic pressurization is not desired, such as during engine or motor operation. In this way, gains in vehicle steering system efficiency may be achieved while allowing the system to maintain hydraulic steering functionality in the event of engine or motor inoperability, if wanted.

Figure 1:
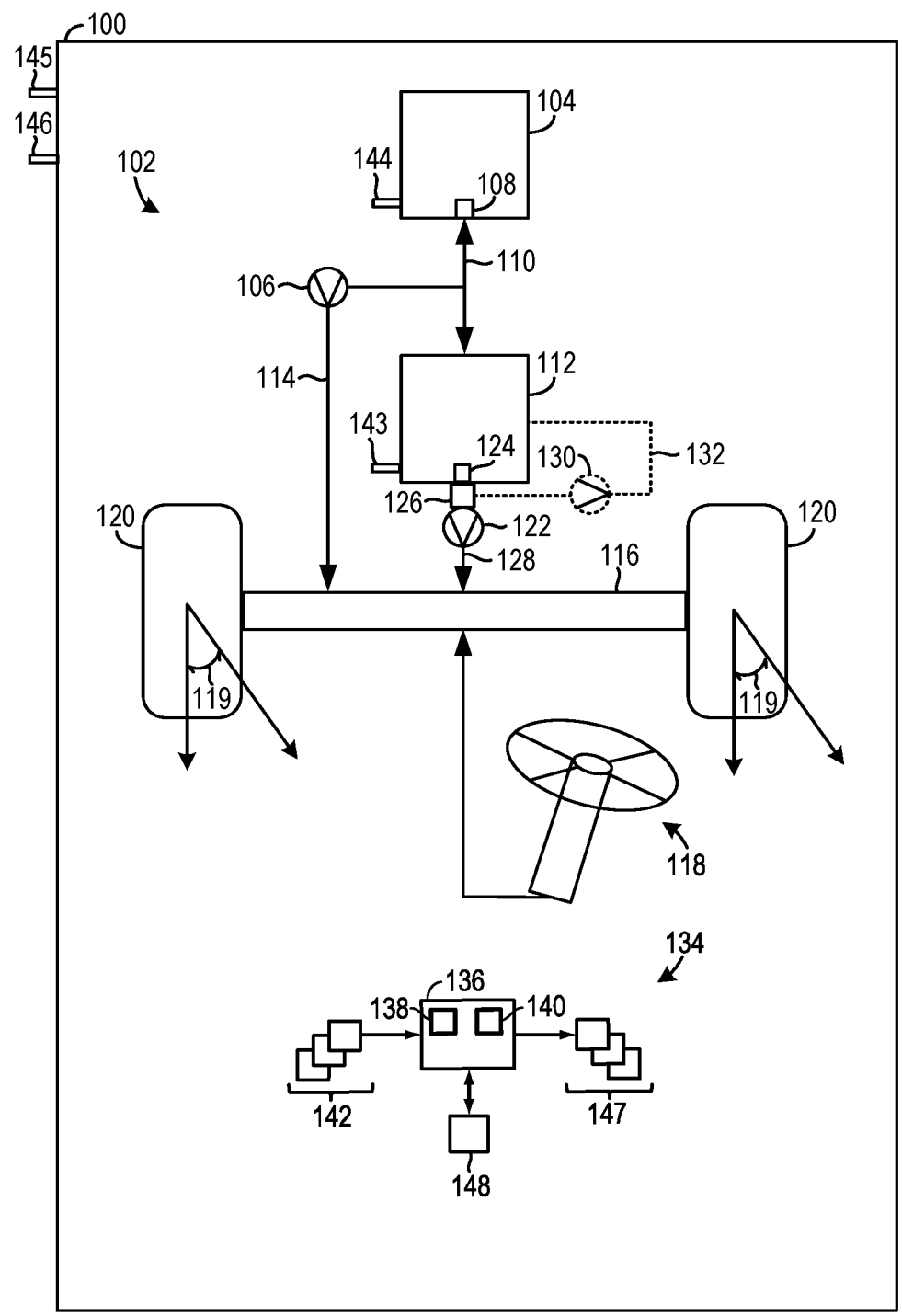
FIG. 1 shows a schematic depiction of a vehicle steering system.
Figure 1:
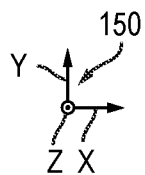
Figure 2:
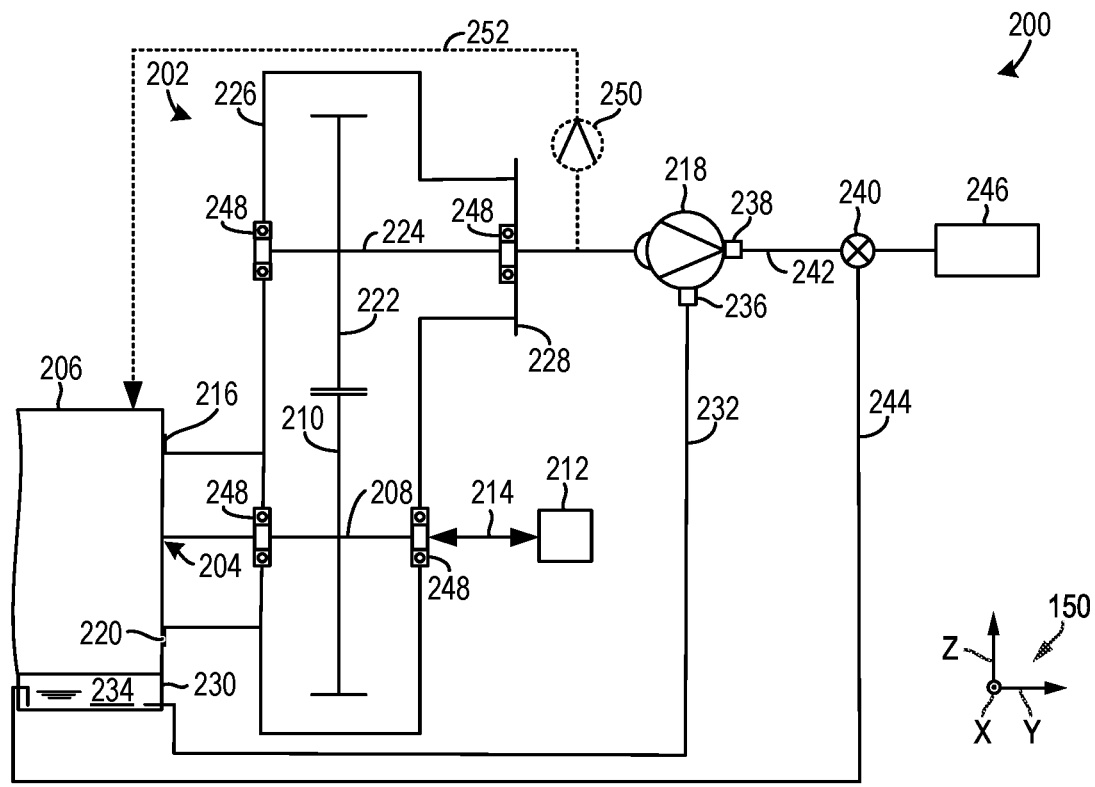
FIG. 2 shows a detailed illustration of a first example of a vehicle steering system.
Figure 3:
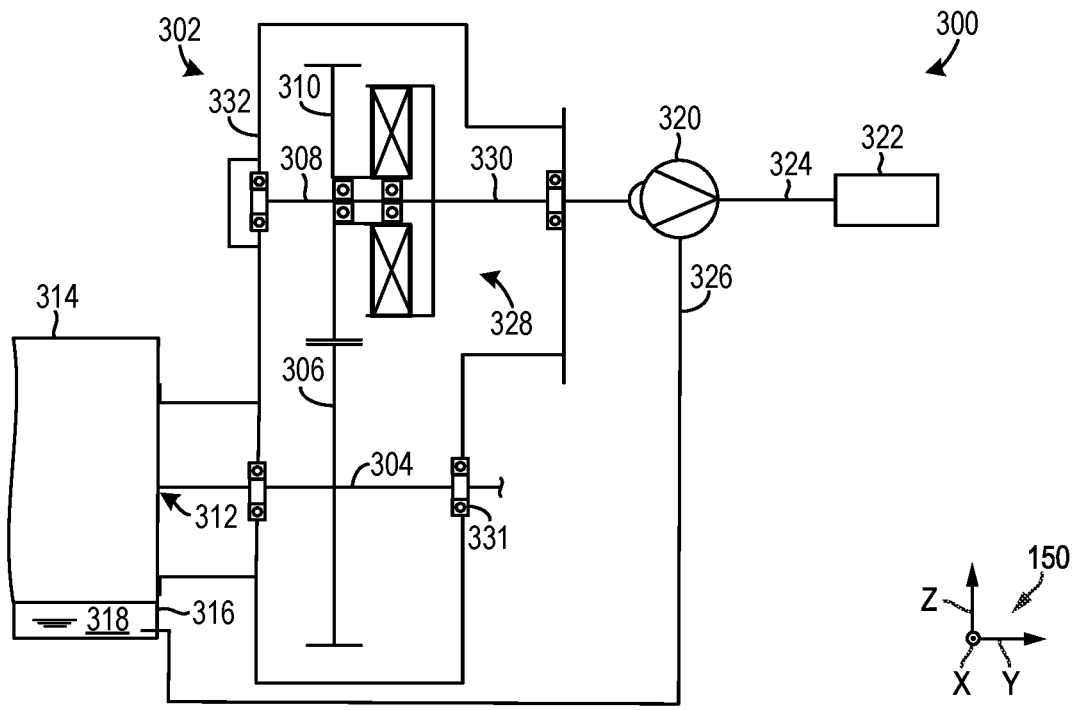
FIG. 3 shows a detailed illustration of a second example of a vehicle steering system.
Figure 4:
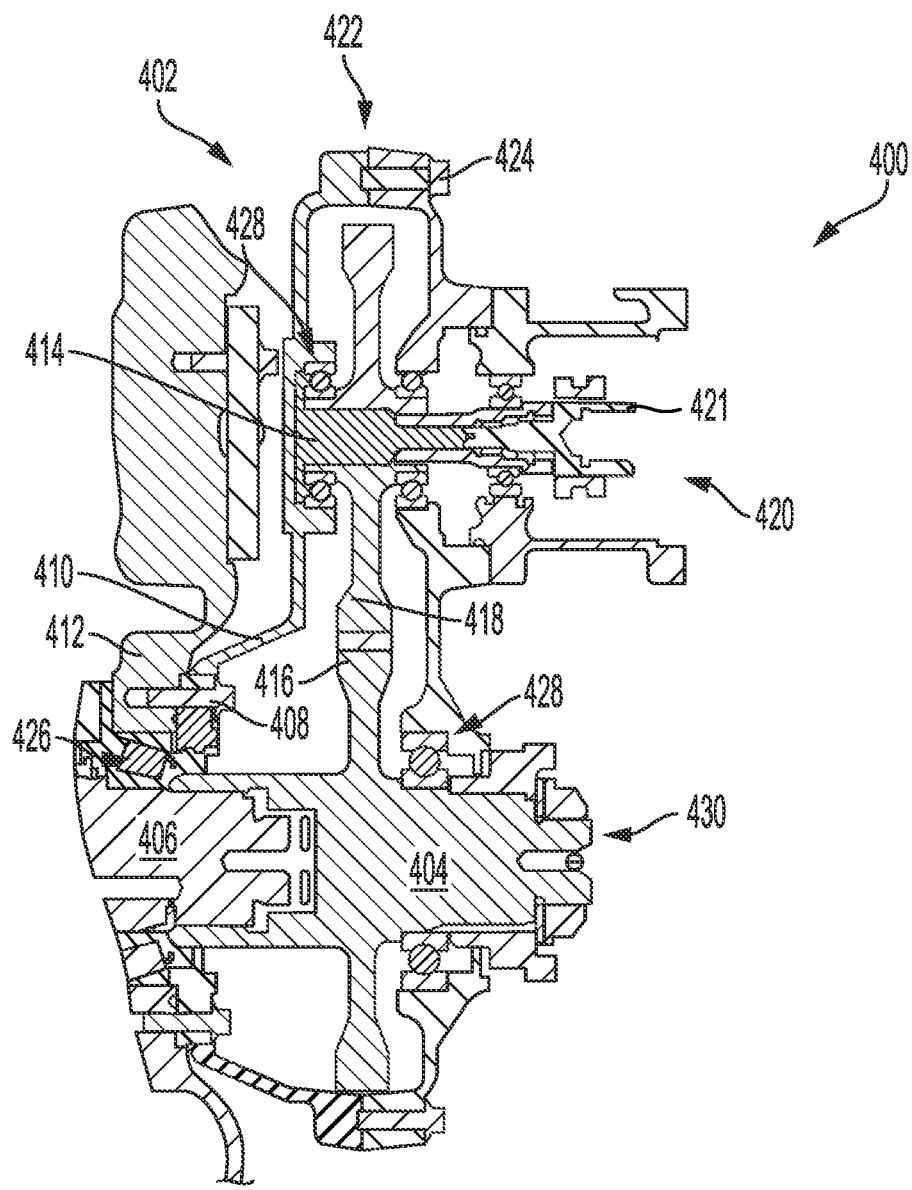
FIG. 4 shows a cross-sectional view of a use-case example of a vehicle steering system.
Figure 4:
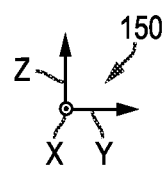
Figure 5:
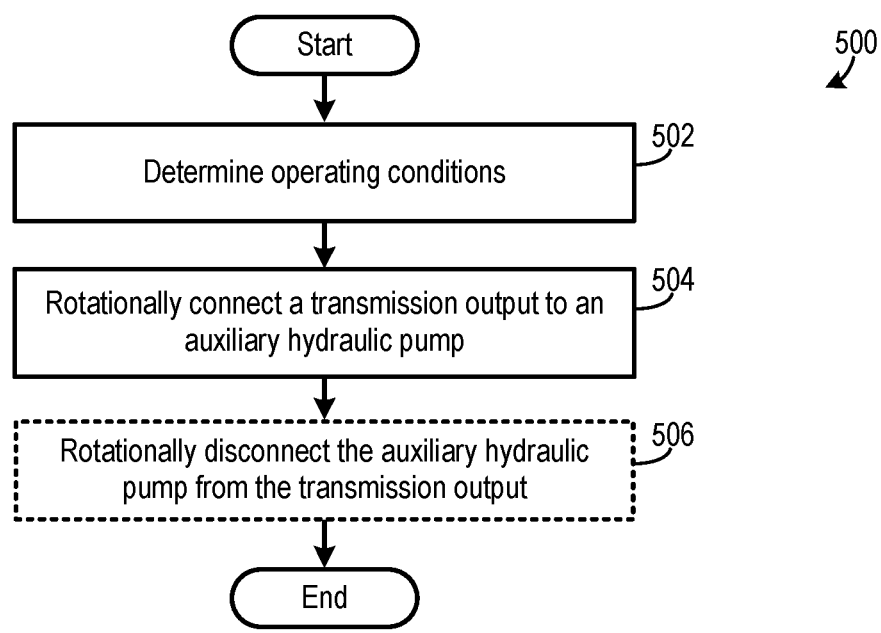
FIG. 5 shows a method for operation of a vehicle steering system.

FIG. 1 shows a schematic illustration of a vehicle with a primary and auxiliary steering pump that increase steering system reliability. FIG. 2 illustrates a first example of a steering system with an auxiliary hydraulic steering pump coupled to a bimodal valve designed to selectively route fluid from the auxiliary hydraulic steering pump to a steering assembly to provide back-up steering force modulation assistance. FIG. 3 depicts a second example of a steering system with an auxiliary hydraulic steering pump and a disconnect device designed to activate and deactivate the auxiliary hydraulic steering pump, when wanted to again provide back-up steering force augmentation without unduly increasing system inefficiencies. FIG. 4 illustrates a detailed example of a steering system in which a mechanical interface efficiently attaches to a transmission output. FIG. 5 depicts a method for operation of a vehicle steering system which activates and deactivates the auxiliary hydraulic pump to increase system efficiency.

FIG. 1 shows an illustration of a vehicle 100 (e.g., a light, medium, or heavy duty vehicle) with a steering system 102 and a motive power source 104. The motive power source 104 may be an internal combustion engine and/or an electric motor. As such, the steering system 102 may be used in an electric vehicle such as hybrid electric vehicles (HEV) or an all-electric vehicle, in some instances. The internal combustion engine may include conventional components for carrying out combustion operation (e.g., four-stroke combustion cycles) such as an intake system, an exhaust system, a fuel delivery system, an emission control system, and the like, as is known in the art. Further, the electric motor may include conventional components for generating rotational output such as a rotor, a stator, a cooling system, a housing, and the like.

The vehicle steering system 102 may include a primary hydraulic steering pump 106. As described herein, a pump is a device configured to move fluid and may include vanes, rotors, shafts, pistons, cylinders, chambers, valves, and the like, to accomplish the fluid movement functionality. The primary hydraulic steering pump 106 may be driven via the motive power source 104. To elaborate, the primary hydraulic steering pump 106 may be coupled to an output 108 (e.g., a crankshaft in the internal combustion engine embodiment or a rotor shaft in the electric motor embodiment) of the motive power source 104. To elaborate, a front-end accessory drive (FEAD) assembly may rotationally connect the motive power source 104 to the primary hydraulic steering pump 106. Therefore, in some examples, the FEAD assembly may drive other suitable components such as a water pump, an air conditioning compressor, an alternator, and the like. Further, the primary hydraulic steering pump 106 may be a vane type pump, a roller type pump, a slipper type pump, or a gear type pump.

Arrows 110 indicates the mechanical attachment between the motive power source 104 and a transmission 112. The mechanical attachment may include shafts, belts, chains, a flywheel, a flexplate, combinations thereof, and the like.

Arrow 114 indicates a hydraulic connection between the primary hydraulic steering pump 106 and a hydraulic steering assembly 116. As follows hydraulic lines, conduits, valves, and the like may provide fluidic communication between the primary hydraulic steering pump and the hydraulic steering assembly. Specifically, in one example, a pressure regulator may be arranged downstream of the primary hydraulic steering pump. A rotary valve in the steering assembly may specifically receive working fluid (e.g., oil) from the primary hydraulic steering pump 106. However, alternate power steering assembly layouts may be used.

The hydraulic steering assembly 116 may include components such as the rotary valve, a hydraulic piston, rods, gears, and the like. For instance, the steering assembly may be a rack and pinion style steering assembly that exhibits higher efficiency and simplicity than other types of steering systems, although other styles of steering assemblies have been contemplated. The steering assembly functions to deliver and amplify, under some conditions, steering input generated through operator interaction with a steering wheel 118, or other suitable input device, to steerable wheels 120 in the vehicle. The amplification of the steering force may be adjusted via the steering assembly based on vehicle speed with a greater force amplification occurring during lower vehicle speeds and less force amplification occurring during higher vehicle speeds, for instance. Angles 119 indicate the angular adjustability of the steerable wheels 120 that may occur in response to operator steering input and the modulation of said input force via the hydraulic steering assembly. In this way, the operator may direct the vehicle according to their predilection.

The vehicle 100 further includes the transmission 112. A variety of transmission types may be deployed in the vehicle such as a single speed transmission, a multispeed transmission, a manual transmission, an automatic transmission, and the like. Specifically, in one example, the transmission 112 may be a hydromechanical variable transmission due to its higher efficiency relative to other types of transmissions. Nevertheless, other styles of transmissions may be used, in other embodiments.

An auxiliary hydraulic steering pump 122 is coupled to an output 124 of the transmission 112 via a mechanical interface 126. Although, the auxiliary hydraulic steering pump and mechanical interface are schematically depicted in FIG. 1, these components have greater structural complexity that is expanded upon herein with regard to FIGS. 2-4. Further, it will be understood that the output of the transmission may further be rotationally coupled to downstream driveline components such as drive shafts, one or more differentials, axle shafts, drive wheels, and the like.

Arrow 128 indicates the fluidic communication between the auxiliary hydraulic steering pump 122 and the hydraulic steering assembly 116. Hoses, lines, conduits, valves, and the like may be deployed to accomplish the hydraulic connection between the auxiliary hydraulic steering pump and the hydraulic steering assembly.

The system 102 may optionally include a lubrication pump 130 rotationally coupled to the mechanical interface 126, in yet another example. In such an example, the lubrication pump 130 may be fluidly connected to the transmission 112 via a line 132 and provides lubricant to internal componentry in the transmission.

Further, the vehicle steering system 102 may include a control system 134 with a controller 136. The controller 136 includes a processor 138 and memory 140. The memory 140 may hold instructions stored therein that when executed by the processor cause the controller 136 to perform the various methods, control techniques, and the like, described herein. The processor 138 may include a microprocessor unit and/or other types of circuits. The memory 140 may include known data storage mediums such as random access memory, read only memory, keep alive memory, combinations thereof, and the like. The memory 140 may include non-transitory memory.

The controller 136 may receive various signals from sensors 142 positioned in different locations in the vehicle 100 and the steering system 102. The sensors may include an oil pressure sensor 143, an engine or motor speed sensor 144, an ambient temperature sensor 145, a vehicle speed sensor 146, and the like. The controller 136 may send control signals to various actuators 147 coupled at different locations in the vehicle 100 and the steering system 102. For instance, the controller 136 may send signals to a valve in the steering system or to the motive power source 104 to adjust operation thereof. For instance, the controller may send a command to a valve in the steering system to alter the state of the valve. The other controllable components in the vehicle and steering system may function in a similar manner with regard to command signals and actuator adjustment. The control system 134 may further include an input device 148. The input device may be a switch, button, touch screen, and the like that allows a vehicle operator to turn on and off operation of the auxiliary hydraulic steering pump. However, in other examples, the auxiliary hydraulic steering pump may be automatically turned on and off based on operating conditions such as transmission sump pressure, the engine's operational state, and the like.

An axis system 150 is further provided in FIG. 1 as well as FIGS. 2-4 for reference. In one example, the z-axis may be parallel to a vertical axis (e.g., gravitational axis), the x-axis may be a lateral axis, and the y-axis may be a longitudinal axis. However, other orientations of the axes may be used, in other examples.

FIG. 2 shows a first example of a vehicle steering system 200. The vehicle steering system 200 is an example of the vehicle steering system 102, depicted in FIG. 1. As such, the vehicle steering system 200 may share common functional and structural features with the steering system 102, shown in FIG. 1, or vice versa.

The vehicle steering system 200 may include a mechanical interface 202 rotationally coupled (e.g., directly rotationally coupled) to an output 204 of a transmission 206. To expound, the mechanical interface 202 includes a first shaft 208 with a first gear 210 that resides thereon. The first shaft 208 may be mechanically coupled to downstream driveline components 212 such as drive shaft(s), one or more differentials, axle shafts, and the like. The mechanical attachment between the first shaft 208 and the components 212 is indicated via arrows 214 and may be accomplished via suitable components such as shafts, gears, chains, belts, combinations thereof, and the like. The mechanical interface 202 may attach to a transmission flange 216, facilitating efficient installation of the mechanical interface 202 and an auxiliary hydraulic steering pump 218 to the transmission 206. Thus, a bearing surface may be formed between the transmission flange 216 and a flange 220 of the mechanical interface 202. However, more structurally complex mounting designs may be used in the system, in other examples.

A second gear 222 in the mechanical interface resides on a second shaft 224. In some examples, the first and second gears 210, 222 may form a gear reduction to alter the rotational speed provided to the auxiliary hydraulic steering pump 218. In this way, the speed and torque of the rotational input provided to the pump may be augmented based on desired pump specifications. The first shaft 208 may be parallel but radially offset from the second shaft 224. In this way, the auxiliary pump may be spaced away from the transmission output in a space efficient location. The second shaft 224 may be coupled to the auxiliary hydraulic steering pump 218. Although, the auxiliary hydraulic steering pump is spaced away from a housing 226, in the example depicted in FIG. 2, the auxiliary hydraulic steering pump 218 may be directly attached to a flange 228 of the housing 226, in other examples. In this way, system compactness may be increased.

If drivetrain issues arise, the vehicle inertia will continue to drive the transmission's output and will also drive the gears 210 and 222 of the auxiliary steering pump drive system. As such, connecting the auxiliary hydraulic steering pump 218 to the transmission output 204 allows the auxiliary hydraulic steering pump to function when the drivetrain is degraded (e.g., the engine ceases to generate rotational output). For instance, when the engine or motor become inoperative, vehicle inertia will continue, temporarily, to drive the transmission output. Thus, gears in the system will be driven which, in turn, drive the auxiliary hydraulic steering pump 218.

The housing 226 of the mechanical interface 202 encloses the shafts 208, 224 and the gears 210, 222. Specifically, the housing 226 may fluidly seal the gears and shafts therein, in one example, and may allow for lubrication thereof. For instance, the gears may be splash lubricated.

The auxiliary hydraulic steering pump 218 may be hydraulically coupled to a transmission sump 230 via a pick-up line 232. Thus, the auxiliary hydraulic steering pump 218 may receive lubrication fluid 234 (e.g., oil) from the transmission sump 230 through an input 236. The auxiliary hydraulic steering pump 218 may further include an output 238 hydraulically coupled to a valve 240 via a hydraulic line 242. The valve 240 may be operated in two modes and therefore may be a bimodal valve, in some instances. In the first mode of the valve, fluid is allowed to flow from the valve 240 to the transmission sump 230 via a hydraulic line 244. To elaborate, in the first mode, the fluid may flow from the valve to the sump without pressurization, to reduce losses in the system. In the second mode, the valve 240 enables fluid flow from the valve to a hydraulic steering assembly 246. Further, in the valve's first mode, fluid flow to the hydraulic steering assembly may be substantially inhibited and in the valve's second mode, fluid flow to the sump from the valve may be substantially inhibited. In this way, the system's efficiency may be increased in the valve's first mode while allowing fluid to flow to the steering assembly for steering assistance in the second mode during selected times, to avoid steering assistance loss.

In some examples, the valve 240 may be actively controlled via a vehicle controller such as the controller 136, depicted in FIG. 1. For instance, the vehicle controller may determine operating conditions such as sump pressure, the engine's operational state, and the like and adjust the valve accordingly. In other examples, the valve 240 may be passively controlled via internal componentry. In some control schemes, pressure of the fluid in the sump 230 may trigger a modal transition (e.g., an active or passive modal transition) in the valve 240. For instance, when the pressure is greater than a threshold value, indicative of engine operation that creates a regulated pressure, the valve 240 may persist in the first mode and when the pressure is less than the threshold value the valve may persist in the second mode. Further, conditions leading to the pressure surpassing or falling below the threshold pressure, causes the valve to transition between the modes. Transitioning between the valves modes based on transmission sump pressure, enables the auxiliary hydraulic steering pump to deliver fluid to the steering assembly when the engine is not operational (ceases to function from degradation or operator intent). In this way, the steering assist functionality provided by the steering system may be maintained over a wider range of vehicle operating conditions.

Bearings 248 (e.g., ball bearings, roller bearings, thrust bearings, combinations thereof, and the like) may be coupled to the first shaft 208 and the second shaft 224 to enable shaft rotation and support. To elaborate, each shaft may include a pair of bearings with a bearing arranged on opposing sides of the gears residing on the shaft. The bearings 248 may be incorporated into the housing 226 of the mechanical interface, to increase system compactness.

Further, in one example, the auxiliary hydraulic steering pump 218 may be activated when the vehicle 100 is towed. For instance, the operator may shut down the engine or motor and hook the vehicle up to a towing vehicle and the drive wheels may be traveling along a driving surface without receiving power from the engine or motor. Thus, the auxiliary hydraulic steering pump 218 may be activated during periods when the vehicle is moving but the engine is shut-off due to operator intent or engine degradation.

The flange 220 and the layout of the vehicle steering system 200 depicted in FIG. 2, may be efficiently attached to the transmission 206. Consequently, the steering system may be efficiently installed and repaired.

The vehicle steering system 200 may further include a lubrication pump 250 designed to deliver lubricant to the transmission 206 via line 252. In this way, transmission lubrication may be enhanced.

FIG. 3 shows a second example of a vehicle steering system 300 which again may share common structural and functional features with the vehicle steering system 102, shown in FIG. 1, and/or the vehicle steering system 200, shown in FIG. 2 or vice versa. As such, redundant description is omitted for brevity.

The vehicle steering system 300 again includes a mechanical interface 302 that may include a first shaft 304 with a first gear 306 residing thereon and a second shaft 308 with a second gear 310 residing thereon. The first shaft 304 is rotationally coupled to an output 312 of a transmission 314. The transmission 314 again includes a sump 316 in which a working fluid 318 resides. The second shaft 308 may be rotationally coupled to an auxiliary hydraulic steering pump 320 which may be fluidly coupled to a steering assembly 322 via a hydraulic line 324. The auxiliary hydraulic steering pump 320 may further receive fluid from the transmission sump 316 via a hydraulic line 326.

The mechanical interface 302 may further include a disconnect device 328 (e.g., a clutch). The disconnect device 328 is configured to rotationally couple and decouple an output shaft 330 of the mechanical interface from the second shaft 308. In this way, the auxiliary hydraulic steering pump 320 may be disconnected when operation of the pump is not desired, such as when the primary hydraulic steering pump is functioning as desired. To accomplish the pump connection and disconnection functionality, the disconnect device 328 may include a plurality of friction plates that engage and disengage one another during operation. To elaborate, the disconnect device may be a wet clutch (e.g., a spring applied hydraulically released wet clutch).

The disconnect device 328 may be actively controlled via a controller, in one example. However, in other examples, the disconnect device 328 may be passively controlled based on oil pressure in the transmission sump. For instance, the disconnect device may be a spring applied hydraulic released wet clutch that is disengaged when the regulated pressure in the transmission sump is present. To elaborate, the regulated pressure from the sump may be applied to the spring loaded actuator to keep the clutch disengaged via compression of the spring. Conversely, when the regulated pressure in the sump is not present, the pressure applied to the spring is released, causing the clutch to engage and connect the auxiliary hydraulic steering pump to the transmission's output via the mechanical interface. In this way, the auxiliary hydraulic steering pump will be driven from the output of the transmission during desired operating conditions. Specifically, when the wet clutch is a spring applied hydraulically released wet clutch, the spring will close the clutch and will ensure that the pump gets connected to the driven output of the transmission.

The mechanical interface 302 again includes bearings 331 that is coupled to shafts in the mechanical interface of the transmission and provide rotational support thereto. Further, in certain examples, at least a portion of the bearings may be incorporated into a housing 332. In certain examples, the steering system 300 may further include a lubrication pump coupled to the output shaft 330. The lubrication pump may be consequently connected and disconnected from the transmission's output via the disconnect device 328.

FIG. 4 shows a use-case example, of a steering system 400 with a mechanical interface 402 which again includes a first shaft 404 coupled to a transmission output 406. Attachment mechanisms 408 (e.g., bolts, screws, clamps, and the like) attach a housing 410 of the mechanical interface to a transmission housing 412.

The mechanical interface 402 may further include a second shaft 414 that is rotationally coupled to the first shaft 404 via gears 416, 418. The steering system 400 may further include a disconnect device 420 designed to connect and disconnect components such as an auxiliary hydraulic steering pump and/or a lubrication pump coupled to a mechanical interface 421. In this way, the auxiliary steering pump may be disconnected when the motor or engine is operating to drive the transmission, thereby increasing the system's efficiency. Conversely, the auxiliary steering pump may be connected in the case of motor or engine degradation, thereby permitting the system's steering assistance to be maintained even when the motor ceases to operate. A housing 422 in the mechanical interface 402 may be split into sections coupled via attachment mechanisms 424. In this way, the interface's internal componentry may be efficiently accessed during maintenance, repair, and the like.

The transmission output 406 may be rotationally supported via a tapered roller bearing 426 and the first and second shafts 404, 414 may be rotationally supported via ball bearings 428, although alternate types of bearings have been contemplated.

The steering system 400 may further include an interface 430 for downstream driveline components such as a driveshaft. In this way, the system may be efficiently incorporated into the driveline without extensive transmission redesign or convoluted installation techniques.

FIG. 5 shows a method 500 for operation of a vehicle steering system. The method may be implemented using any of the steering systems described above with regard to FIGS. 1-4. Specifically, the method may be implemented via the second exemplary steering system depicted in FIG. 3. However, the method 500 may be implemented by other suitable vehicle steering systems, in other examples. It will be understood that the method steps be stored as instructions in non-transitory memory executable by a processor in a controller, for example.

At 502, the method includes determining operating conditions. Step 502 may be implemented when the steering system executes an active valve control strategy. However, step 502 may be omitted from the method, in certain examples. For instance, the valve and/or clutch coupled to the auxiliary hydraulic steering pump may be passively controlled based on transmission sump pressure. In such an example, step 502 may not be included in the control method 500.

In some examples, the method may include a logic step in which a decision is made to rotationally connect or disconnect the auxiliary hydraulic steering pump from the transmission output based on operating conditions such as engine or motor speed, primary pump speed, vehicle speed, motive power source status (e.g., engine or motor fault flags), primary pump status (e.g., pump fault flags), and the like. For instance, the auxiliary hydraulic steering pump may be connected to the transmission when the engine speed or transmission oil pressure falls below a threshold value and vice versa. In other examples, the rotational connection or disconnection of the auxiliary hydraulic steering pump from the transmission may be initiated responsive to operator interaction with an input device (e.g., a button, a switch, a touch interface, and the like) indicative of the operator's desire to active or deactivate the auxiliary hydraulic steering pump.

At 504, the method includes rotationally connecting a transmission output to an auxiliary hydraulic steering pump. The rotational connection between the auxiliary hydraulic steering pump and the transmission may be implemented via operation of a disconnect device (e.g., a wet clutch). To elaborate, the disconnect device may be engaged, via interaction between friction plates for instance, to transfer torque from the transmission output to the auxiliary hydraulic steering pump. In one example, the rotational connection between the auxiliary hydraulic steering pump and the transmission may be automatically implemented via controller logic. For instance, the auxiliary hydraulic steering pump may be automatically coupled to the transmission when it is determined that the primary pump and/or the engine have been degraded. A pressure threshold in the system may be indicative of degradation of the primary hydraulic steering pump and the engine. For instance, when a pressure in a higher-pressure line of the transmission between a pressure regulator and the primary pump is above a threshold value (e.g., greater than or equal to a regulated pressure) the auxiliary hydraulic steering pump may be disconnected from the transmission output and vice versa.

At 506, the method may include rotationally disconnecting the auxiliary hydraulic steering pump from the transmission output. For instance, a disconnect device such as a wet clutch may be disengaged to decouple the auxiliary hydraulic steering pump from the transmission output. As indicated above, controller logic may ascertain when to disconnect the auxiliary hydraulic steering pump from the transmission. For instance, the auxiliary hydraulic steering pump may be deactivated when the motive power source and/or primary pump regain functionality. However, in other examples, the disconnect device may be passively activated and deactivated based on the fluid pressure in the transmission's sump. For instance, the disconnect device may rotationally disconnect the auxiliary hydraulic steering pump when the transmission sump pressure is greater than a threshold value (indicative of engine or motor operation). Thus, in one example, when the engine or motor shuts off and the transmission loses its regulated pressure, the disconnect device may connect the auxiliary hydraulic steering pump to the transmission. Conversely, when the engine or motor is turned on and the transmission regains its regulated pressure, the auxiliary hydraulic steering pump may be rotationally reconnected to the transmission. In this way, the auxiliary hydraulic steering pump may be selectively activated when back-up pump operation is desirable, thereby increasing steering system and more generally vehicle efficiency.

The technical effect of the vehicle steering system and control method described herein is to decease the chance of a loss of vehicle steering assistance from a steering assembly. Another technical effect of the vehicle steering system and control method described herein is to increase steering assembly efficiency via the decoupling of the auxiliary hydraulic steering pump from the transmission when auxiliary pressurization of the hydraulic fluid in the steering system is not wanted.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle steering system is provided that comprises a mechanical interface coupled to an auxiliary hydraulic steering pump and an output of a transmission, wherein the transmission is mechanically coupled to a motive power source; wherein the auxiliary hydraulic steering pump is hydraulically coupled to a hydraulic steering assembly.

In another aspect, a method for operating a vehicle steering system is provided that comprises rotationally connecting a transmission output to an auxiliary hydraulic steering pump and delivering hydraulic fluid to a hydraulic steering assembly from the auxiliary hydraulic steering pump when a primary hydraulic steering pump is inoperative, wherein the auxiliary hydraulic steering pump is rotationally coupled to the transmission output via a mechanical interface attached to a flange or shaft of the transmission. In one example, the method may further comprise rotationally disconnecting the transmission output from the auxiliary hydraulic steering pump based on a pressure of a fluid in a higher-pressure line of the transmission that is arranged between a pressure regulator and the primary hydraulic steering pump.

In yet another example, a vehicle power steering system is provided that comprises a mechanical interface rotationally coupled to an auxiliary hydraulic steering pump and an output of a transmission, wherein the transmission is mechanically coupled to a motive power source and wherein the auxiliary hydraulic steering pump is hydraulically coupled to a hydraulic steering assembly; and a primary hydraulic steering pump rotationally coupled to the motive power source and hydraulically coupled to the hydraulic steering assembly; wherein the auxiliary hydraulic steering pump is designed to deliver fluid to the hydraulic steering assembly when the motive power source is inoperative.

In any of the aspect or combinations of the aspects, the mechanical interface may include a first gear on a first shaft that is directly coupled to the output of the transmission; and a second gear on a second shaft directly that is coupled to an input of the auxiliary hydraulic steering pump.

In any of the aspect or combinations of the aspects, the vehicle steering system may further comprise a primary hydraulic steering pump rotationally coupled to an output of the motive power source and hydraulically coupled to the hydraulic steering assembly.

In any of the aspect or combinations of the aspects, the vehicle steering system may further comprise a valve coupled to the auxiliary hydraulic steering pump and configured to operate: in a first mode in which fluid is delivered from the auxiliary hydraulic steering pump to a transmission sump; and in a second mode in which fluid is delivered from the auxiliary hydraulic steering pump to the hydraulic steering assembly.

In any of the aspect or combinations of the aspects, the valve may be configured to transition between the first mode and the second mode based on a pressure of the fluid in a higher-pressure line of the transmission that is arranged between a pressure regulator and a primary hydraulic steering pump.

In any of the aspect or combinations of the aspects, the fluid may flow unpressurized from the auxiliary hydraulic steering pump to the transmission sump.

In any of the aspect or combinations of the aspects, the vehicle steering system may further comprise a disconnect device coupled to the mechanical interface and configured to selectively disconnect the auxiliary hydraulic steering pump from the transmission output.

In any of the aspect or combinations of the aspects, the disconnect device may be a wet clutch.

In any of the aspect or combinations of the aspects, the vehicle steering system may further comprise a controller including executable instructions stored in non-transitory memory that, during an operating condition, cause the controller to: disconnect the auxiliary hydraulic steering pump via the disconnect device.

In any of the aspect or combinations of the aspects, the auxiliary hydraulic steering pump may be automatically disconnected and the operating condition may be a condition where a primary hydraulic steering pump is not delivering pressurized fluid to the hydraulic steering assembly.

In any of the aspect or combinations of the aspects, the auxiliary hydraulic steering pump may be automatically disconnected and connected based on a threshold value of system pressure.

In any of the aspect or combinations of the aspects, the mechanical interface may be coupled to a flange or shaft of the transmission.

In any of the aspect or combinations of the aspects, the motive power source may be an electric motor or an internal combustion engine.

In any of the aspect or combinations of the aspects, the transmission may be a hydromechanical variable transmission.

In any of the aspect or combinations of the aspects, the steering system may further comprise a disconnect device coupled to the mechanical interface and configured to disconnect the auxiliary hydraulic steering pump from the transmission output when the motive power source is operational.

In any of the aspect or combinations of the aspects, the disconnect device may be a wet clutch designed to automatically disconnect the auxiliary hydraulic steering pump from the transmission output based on a pressure of a fluid in a higher-pressure line of the transmission that is arranged between a pressure regulator and the primary hydraulic steering pump.

In any of the aspect or combinations of the aspects, the steering system may further comprise a bimodal valve configured to flow unpressurized fluid from the auxiliary hydraulic steering pump to a transmission sump in a first mode and flow fluid from the auxiliary hydraulic steering pump to the hydraulic steering assembly in a second mode.

In another representation, a power steering system is provided with a primary hydraulic steering pump coupled to a motive power source and a back-up steering pump directly coupled to a transmission output. In this representation, the transmission is rotationally coupled to the motive power source, and a pressure deactivated disconnect clutch designed to decouple the back-up steering pump from the transmission output when an oil pressure in a transmission sump is greater than a regulated pressure and couple the back-up steering pump to the transmission output when the oil pressure is less than the regulated pressure.

As used herein, the term "approximately" is construed to mean plus or minus five percent of the value or range, unless otherwise specified.

Note that the example control routines included herein can be used to control a variety of steering system configurations. At least a portion of the control steps disclosed herein may be stored as executable instructions in non-transitory memory and may be carried out by a system including a controller in combination with the various sensors, actuators, and other equipment. Various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in a system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. It will be appreciated that the configurations disclosed herein are exemplary in nature, and that these specific examples are not to be considered in a limiting sense, because numerous variations are possible. For example, the above technology can be applied to a variety of vehicle systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle steering system, comprising:
a mechanical interface coupled to an auxiliary hydraulic steering pump and an output of a transmission, wherein the transmission is mechanically coupled to a motive power source;
wherein the auxiliary hydraulic steering pump is hydraulically coupled to a hydraulic steering assembly; and
a disconnect device coupled to the mechanical interface and configured to selectively disconnect the auxiliary hydraulic steering pump from the output of the transmission, the disconnect device being a wet clutch.

2. The vehicle steering system of claim 1, wherein the mechanical interface includes:
a first gear on a first shaft that is directly coupled to the output of the transmission; and
a second gear on a second shaft that is directly coupled to an input of the auxiliary hydraulic steering pump.

3. The vehicle steering system of claim 1, further comprising a primary hydraulic steering pump rotationally coupled to an output of the motive power source and hydraulically coupled to the hydraulic steering assembly.

4. The vehicle steering system of claim 1, further comprising a valve coupled to the auxiliary hydraulic steering pump and configured to operate:
in a first mode in which a fluid is delivered from the auxiliary hydraulic steering pump to a transmission sump; and
in a second mode in which the fluid is delivered from the auxiliary hydraulic steering pump to the hydraulic steering assembly.

5. The vehicle steering system of claim 4, wherein the valve is configured to transition between the first mode and the second mode based on a pressure of the fluid in a higher-pressure line of the transmission that is arranged between a pressure regulator and a primary hydraulic steering pump.

6. The vehicle steering system of claim 4, wherein the fluid flows unpressurized from the auxiliary hydraulic steering pump to the transmission sump.

7. The vehicle steering system of claim 1, further comprising a controller including executable instructions stored in non-transitory memory that, during an operating condition, cause the controller to:
disconnect the auxiliary hydraulic steering pump via the disconnect device.

8. The vehicle steering system of claim 7, wherein the auxiliary hydraulic steering pump is automatically disconnected and the operating condition is a condition where a primary hydraulic steering pump is not delivering pressurized fluid to the hydraulic steering assembly.

9. The vehicle steering system of claim 8, wherein the auxiliary hydraulic steering pump is automatically disconnected based on a threshold value of system pressure.

10. The vehicle steering system of claim 1, wherein the mechanical interface is coupled to a flange or shaft of the transmission.

11. The vehicle steering system of claim 1, wherein the motive power source is an electric motor or an internal combustion engine.

12. The vehicle steering system of claim 1, wherein the transmission is a hydromechanical variable transmission.

13. A method for operating a vehicle steering system, comprising:
rotationally connecting a transmission output to an auxiliary hydraulic steering pump and delivering hydraulic fluid to a hydraulic steering assembly from the auxiliary hydraulic steering pump when a primary hydraulic steering pump is inoperative; and
rotationally disconnecting the transmission output from the auxiliary hydraulic steering pump based on a pressure of a fluid in a higher-pressure line of the transmission that is arranged between a pressure regulator and the primary hydraulic steering pump;
wherein the auxiliary hydraulic steering pump is rotationally coupled to the transmission output via a mechanical interface attached to a flange or shaft of the transmission.

14. A vehicle power steering system, comprising:
a mechanical interface rotationally coupled to an auxiliary hydraulic steering pump and an output of a transmission, wherein the transmission is mechanically coupled to a motive power source and wherein the auxiliary hydraulic steering pump is hydraulically coupled to a hydraulic steering assembly;
a primary hydraulic steering pump rotationally coupled to the motive power source and hydraulically coupled to the hydraulic steering assembly;
wherein the auxiliary hydraulic steering pump is designed to deliver fluid to the hydraulic steering assembly when the motive power source is inoperative; and
a disconnect device coupled to the mechanical interface and configured to disconnect the auxiliary hydraulic steering pump from the transmission output when the motive power source is operational, the disconnect device being a wet clutch.

15. The vehicle power steering system of claim 14, wherein the disconnect device is designed to automatically disconnect the auxiliary hydraulic steering pump from the transmission output based on a pressure of a fluid in a higher-pressure line of the transmission that is arranged between a pressure regulator and the primary hydraulic steering pump.

16. The vehicle power steering system of claim 14, further comprising a bimodal valve configured to flow unpressurized fluid from the auxiliary hydraulic steering pump to a transmission sump in a first mode and flow fluid from the auxiliary hydraulic steering pump to the hydraulic steering assembly in a second mode.

* * * * *